UNITED STATES PATENT OFFICE.

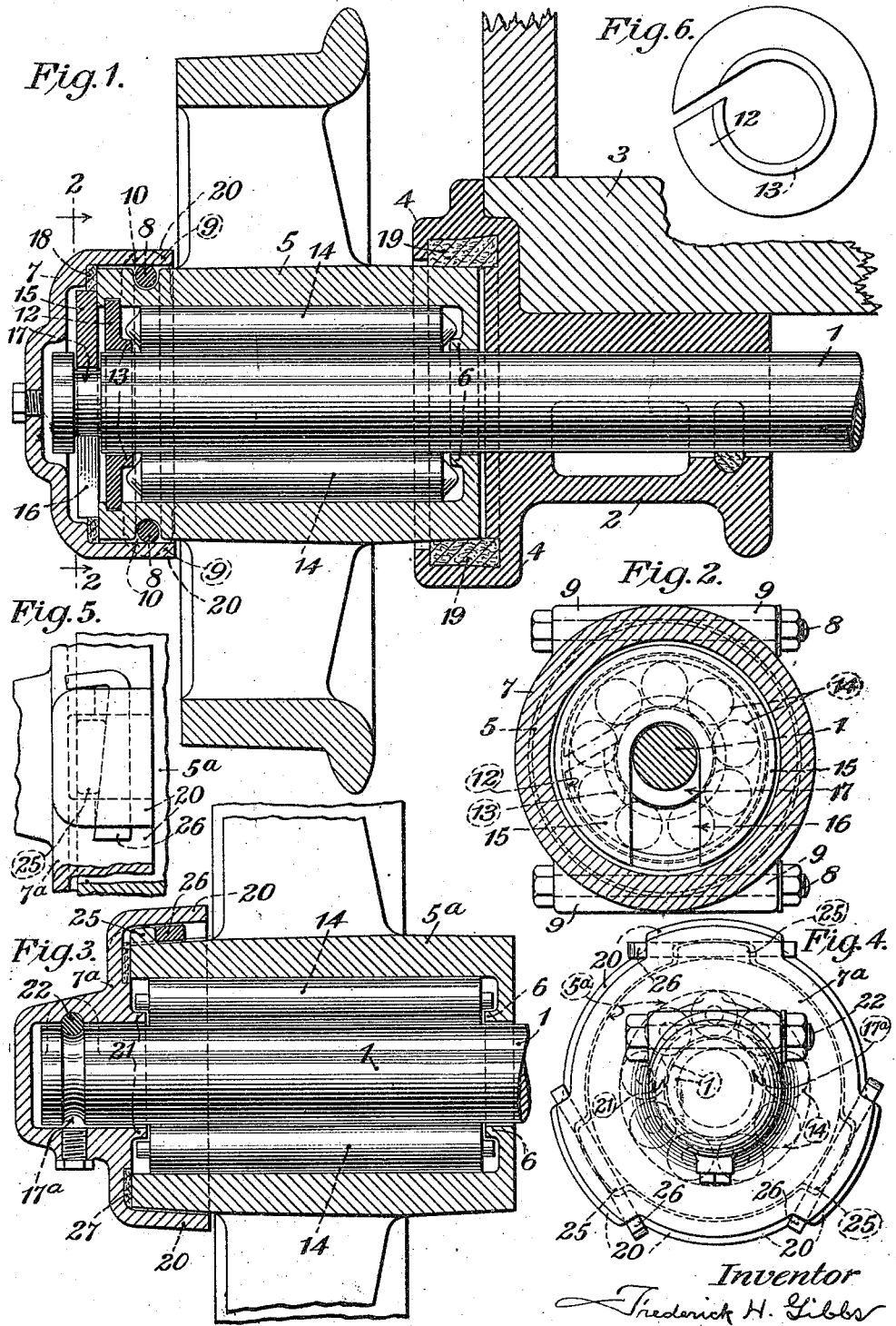

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY.

MINE-CAR WHEEL AND ATTACHING MEANS THEREFOR.

1,224,736.     Specification of Letters Patent.     Patented May 1, 1917.

Application filed October 30, 1916. Serial No. 128,487.

*To all whom it may concern:*

Be it known that I, FREDERICK H. GIBBS, residing in the borough of Brooklyn, county of Kings, city and State of New York, and being a citizen of the United States, have invented certain new and useful Improvements in Mine-Car Wheels and Attaching Means Therefor, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 illustrates a relatively central, vertical, longitudinal sectional view through a mine car wheel and pedestal upon which latter is mounted a fragment of a car body;

Fig. 2 is a transverse sectional view, the section being taken on line 2—2 of Fig. 1 looking in the direction indicated by the arrows;

Fig. 3 illustrates the preferred form of my invention in longitudinal vertical section;

Fig. 4 is an elevational view of the hub portion of the wheel of Fig. 3;

Fig. 5 shows, in an enlarged fragmentary detail, the locking means adapted to unite the cast elements of the wheels; and Fig. 6 is a locking ring hereinafter referred to.

The object of the invention is to provide a simple, rugged and durable mine car wheel comprising a minimum number of parts coöperating with suitable means for locking the same upon the axle, dispensing with a great many of the small, light and frail appurtenances commonly employed to support or position bearing rollers within the wheel.

An object of the invention is to provide a preferably two-part roller bearing mine car wheel which is readily adapted to receive therein bearing rollers and which may be locked in position upon an axle by means preferably, in part, within the wheel hub.

It is preferred to use what is known as a closed hub wheel, that is, a wheel in which the axle terminates within the hub portion of the wheel, though it is evident that other types of wheels may be employed in which the principal components of the present invention are utilized and the axle extends through the outer wall or hub cap of the wheel.

Referring specifically to the parts, 1 indicates the axle, 2 a pedestal or journal box which is attached by any suitable means to the car body or sill 3 and is preferably provided with an open and flanged outer end portion 4, as shown.

Extending within the pedestal, as best shown in Fig. 1, is a wheel hub 5 which is provided on its inner end with an integral annular roller-supporting flange 6 which is cast with the hub and which may afterward be machine-dressed, if necessary, to secure additional smoothness or perfection of detail contour.

The outer end of the wheel hub is closed by a hub cap 7, which, in the illustration of the invention shown in Fig. 1, is secured in position by bolts 8 extending transversely through a suitable seat 9, therefor in the hub cap 7, and through a circumscribing annular recess 10 in the outer end portion of the hub 5, thereby locking said hub cap 7 firmly in position.

In the disclosure shown in Fig. 1, an annular spring ring 12 is employed which is provided with a longitudinally extending flange 13 upon which rests the outer ends of the rollers 14, the inner ends of which are supported by the flange 6 before referred to. Outside of the spring ring 12, and preferably bearing against the outer face of the hub 5, is a disk 15 provided with a U-shaped slot 16, as best shown in Fig. 2, which permits slipping said disk 15 into the annular recess 17 formed in the outer end of the axle 1. Interposed between the hub cap 7 and the outer end of the wheel hub 5, is a packing, preferably of felt, 18, to assist in retaining lubricant in position, similar packing 19 surrounding the inner end of the wheel hub, as best shown in Fig. 1.

The preferred form of the invention, however, is simpler in that it comprises preferably but two cast metal parts, consisting of a hub portion 5ª, provided with an annular flange 6 at its inner end, and a hub cap 7ª having a circumscribing flange 20 corresponding to a similar flange 20 in Fig. 1, but with this difference, however, the hub cap 7ª is provided with an integral annular flange 21 which, with the inner flange 6 serves as supporting means for the bearing rollers 14, while the bolt 22, which passes through the hub cap 7ª, interlocks with an annular recess 17ª in the outer end of the axle, said bolt being provided with a suitable head and locking nut, as shown in Fig. 4.

In this construction the hub is slightly modified in that it is provided with a plurality of radially extending lugs 25 which coöperate with removable keys 26 which pass through openings in the flange 20 within the radially extending lugs 25, that is, between such lugs and the spokes of the wheels. As the keys 26 are preferably wedge-shaped, it is evident that driving said keys will tend to draw the hub cap 7ª inwardly upon the outer end of the hub 5ª and when the parts are properly positioned the bolt 22 may be inserted.

Interposed between the hub cap 7ª and the outer end of the hub 5ª is an annular packing 27 of felt, or other suitable material, adapted to prevent undue escape of lubricant which may be supplied to the roller bearings in any desired manner.

What I claim is:

1. In combination, a wheel provided with a cast metal hub having an axle opening and an integral roller supporting flange at its inner end, a hub cap adapted to telescope with the outer end of said hub, a roller supporting flange within said hub cap and means adapted to coöperate with an axle within said hub cap to retain the wheel on an axle.

2. In combination, a wheel provided with a cast metal hub having an axle opening and an integral roller supporting flange at its inner end, a hub cap adapted to telescope with the outer end of said hub, a roller supporting flange integral with said hub cap, rollers supported by said flanges when the wheel is removed from an axle and removable means adapted to lock said hub cap in operative position.

3. In combination, an axle, a roller bearing wheel comprising but two parts each adapted to support one end of a set of bearing rollers and removable means wholly external to one of said parts adapted to lock said parts in operative position.

4. In combination, an axle, a roller bearing wheel comprising but two telescoping parts each adapted to support one end of a set of bearing rollers and removable means wholly external to one of said parts adapted to lock all of said parts in operative position.

5. In combination, an axle, a roller bearing wheel comprising but two cast metal parts each adapted to support bearing rollers and tangentially disposed removable means adapted to lock all of said parts in operative position.

6. In combination in a wheel, a wheel hub having an integral roller supporting-flange at one end, a telescoping hub cap and roller-supporting flange at its other end and removable means adapted to secure said hub cap in position.

7. In combination in a wheel, a wheel hub having an integral roller-supporting flange at one end, a telescoping hub cap and roller-supporting flange at its other end, and removable means extending within said hub cap adapted to secure the wheel on an axle.

8. In combination in a wheel, a cast metal hub having integral bearing-roller-supporting-flange therein at one end, a cap telescoping with and inclosing the other end of said hub, removable means adapted to secure said cap in position, and roller supporting means within the hub cap.

9. A complete roller-bearing mine car wheel comprising but two parts adapted to support bearing rollers when the wheels are removed from an axle, and means wholly external to one of said parts for securing said parts in operative relation.

10. In combination in a car wheel, a tread portion, spokes and a hub which latter is provided with an internal roller-supporting flange within its inner end, a telescoping hub-cap closing the outer end of the hub and inclosing a part thereof said hub-cap being provided with a roller supporting flange extending into said hub and removable means locking said hub-cap in position on said hub.

In witness whereof I have hereunto set my hand in the presence of two witnesses.

FREDERICK H. GIBBS.

Witnesses:
EDW. D. HILLMAN,
FLORA M. CURTIS.